US012415261B2

(12) United States Patent
Zheng et al.

(10) Patent No.: US 12,415,261 B2
(45) Date of Patent: Sep. 16, 2025

(54) POWER TOOL

(71) Applicant: Nanjing Chervon Industry Co., Ltd., Nanjing (CN)

(72) Inventors: Hanqing Zheng, Nanjing (CN); Xiangqing Fu, Nanjing (CN); Liang Chen, Nanjing (CN); Chunrui Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 31 days.

(21) Appl. No.: 18/084,601

(22) Filed: Dec. 20, 2022

(65) Prior Publication Data

US 2023/0128074 A1 Apr. 27, 2023

Related U.S. Application Data

(63) Continuation of application No. PCT/CN2021/101437, filed on Jun. 22, 2021.

(30) Foreign Application Priority Data

Jul. 3, 2020 (CN) ......................... 202010631586.7
Oct. 26, 2020 (CN) ......................... 202011158306.1
(Continued)

(51) Int. Cl.
*B25F 3/00* (2006.01)
*B25F 5/02* (2006.01)

(52) U.S. Cl.
CPC . *B25F 3/00* (2013.01); *B25F 5/02* (2013.01)

(58) Field of Classification Search
CPC ............... B25F 3/00; B25F 5/02; B25F 5/001
(Continued)

(56) References Cited

U.S. PATENT DOCUMENTS 2,303,565 A * 12/1942 Luna ....................... B23B 45/02 470/96
2,780,942 A * 2/1957 Babcock ................ B23Q 5/045 74/417
(Continued)

FOREIGN PATENT DOCUMENTS

AU 2008314502 A1 * 6/2010 ........... B23B 39/205
CN 103963017 A 8/2014
(Continued)

OTHER PUBLICATIONS

ISA/CN, Translation of Int. Search Report issued on PCT application No. PCT/CN2021/101437, dated Sep. 24, 2021, 3 pages.
(Continued)

*Primary Examiner* — Robert F Long
(74) *Attorney, Agent, or Firm* — Greenberg Traurig, LLP

(57) ABSTRACT

A power tool includes an output assembly and a battery pack. The output assembly is disposed at an end portion of a first handle, the output assembly includes at least two output units spaced apart and used for connecting working accessories, and the output assembly is rotatable about a shift axis to shift an output unit among the at least two output units to a working position or a non-working position. The battery pack is disposed at a bottom of a body, the battery pack includes a standing surface through which the power tool is capable of standing, and when the power tool stands, a projection of a center of gravity of the power tool on the standing surface is in the standing surface.

18 Claims, 14 Drawing Sheets

(30) Foreign Application Priority Data

Jun. 4, 2021 (CN) ......................... 202110624692.7
Jun. 4, 2021 (CN) ......................... 202110625432.1

(58) Field of Classification Search
USPC ........ 173/197, 81, 90, 140–141, 162.1, 198, 173/213–217, 168–171
See application file for complete search history.

(56) References Cited

U.S. PATENT DOCUMENTS 2,919,609 A * 1/1960 Klingbeil .............. B23B 45/003 144/48.6
2,957,353 A * 10/1960 Babacz ..................... F16C 1/00 403/220
4,171,083 A * 10/1979 Lippacher .............. B25D 11/00 173/29
4,512,693 A * 4/1985 Swanson ................. B23B 51/00 408/239 R
4,768,405 A * 9/1988 Nickipuck ............ B25B 15/001 81/177.85
4,810,916 A * 3/1989 McBride ................. B25B 21/00 310/83
4,962,681 A * 10/1990 Yang ....................... B25B 21/00 408/20
4,976,173 A * 12/1990 Yang ......................... B25F 3/00 81/177.8
5,063,796 A * 11/1991 Gennep ................. B25B 13/481 362/120
5,149,230 A * 9/1992 Nett .......................... B25F 3/00 81/57.32
5,573,358 A * 11/1996 Gobbers ............... B23B 45/003 408/239 R
6,506,002 B1 * 1/2003 Cummins ............. B23B 39/205 408/124
7,191,677 B2 * 3/2007 Barkdoll ................... F16H 1/14 81/57.28
7,367,757 B2 * 5/2008 Phillips ..................... B25F 3/00 408/124
7,371,033 B2 * 5/2008 Whitehead ................ B25F 3/00 173/214
D627,616 S * 11/2010 Whitehead ....................... D8/69
7,997,835 B2 * 8/2011 Whitehead ............ B23B 39/205 408/139
8,109,344 B1 * 2/2012 Hays ......................... B25F 3/00 173/171
10,576,594 B2 * 3/2020 Hill ....................... B25B 21/002
10,994,399 B2 * 5/2021 Duggan ............... B25D 16/006
2003/0165365 A1 * 9/2003 Eriksen ..................... B25F 3/00 408/35
2009/0022557 A1 * 1/2009 Whitehead ................ B25F 3/00 408/35
2010/0202842 A1 * 8/2010 Whitehead ................ B25F 3/00 408/139
2013/0032368 A1 * 2/2013 Zhang ..................... B25F 5/029 173/217
2014/0144663 A1 * 5/2014 Fuchs ....................... B25F 5/02 173/217
2014/0329654 A1 * 11/2014 Andriolo ................. B25B 21/00 483/57
2019/0009398 A1 * 1/2019 Zhong ..................... B23B 45/02

FOREIGN PATENT DOCUMENTS

| | | | | |
|---|---|---|---|---|
| CN | 103963018 | A | 8/2014 | |
| CN | 210361183 | U | 4/2020 | |
| CN | 211491357 | U | 9/2020 | |
| EP | 0280527 | A2 | 8/1988 | |
| GB | 1357007 | A | 6/1974 | |
| IN | 103963018 | A | 8/2014 | |
| JP | 2017136652 | A | 8/2017 | |
| WO | WO-0117728 | A1 * | 3/2001 | ........... B23B 39/205 |

OTHER PUBLICATIONS

ISA/CN, International Search Report issued on PCT application No. PCT/CN2021/101437, dated Sep. 24, 2021, 4 pages.
ISA/CN, Written Opinion issued on PCT application No. PCT/CN2021/101437, dated Sep. 24, 2021, 3 pages.
ISA/CN, Translation of the Written Opinion issued on PCT application No. PCT/CN2021/101437, dated Sep. 24, 2021, 3 pages.

* cited by examiner

POWER TOOL

RELATED APPLICATION INFORMATION

This application is a continuation of International Application Number PCT/CN2021/101437, filed on Jun. 22, 2021, through which this application also claims the benefit under 35 U.S.C. § 119(a) of Chinese Patent Application No. CN 202010631586.7 filed Jul. 3, 2020, Chinese Patent Application No. CN 202011158306.1 filed Oct. 26, 2020, Chinese Patent Application No. CN 202110625432.1 filed Jun. 4, 2021, and Chinese Patent Application No. CN 202110624692.7 filed Jun. 4, 2021, which are incorporated by reference in their entireties.

TECHNICAL FIELD

The present application relates to the technical field of power tools, for example, a power tool with multiple output units.

BACKGROUND

Typically, a handheld power tool has only one output head for mounting a working accessory. Therefore, when the power tool is used, the working accessory needs to be replaced in conjunction with different use conditions. When the working accessory is replaced, the original working accessory needs to be removed and then a working accessory to be used is mounted. It is cumbersome to remove and mount the working accessories, which affects a user's experience and work efficiency in a working process. Therefore, some power tools each of which has double working heads appear in the related art, where positions of the double working heads are shifted so that requirements of different working conditions can be met.

However, a power tool with double working heads in the related art has the following problems: firstly, since a working head and a structure for shifting the double working heads are added, the power tool with the double working heads typically has a complicated structure and a great weight, which is inconvenient for the user to operate, has redundant structures occupying a relatively large space of the whole machine, and is not conducive to the miniaturization of the whole machine; secondly, the arrangement of internal structures and the shape of the whole machine are improper, resulting in the deviation of the center of gravity of the whole machine, which causes the tool to stand unsteadily during use, leads to poor user experience, and reduces the work efficiency of the tool; and thirdly, a clutch mechanism is typically further provided so that it is convenient to break a transmission connection between a working head and a transmission mechanism when the working head is shifted, a locking switch in the related art for implementing a disconnection and a connection is typically disposed on a handle of a main body and far from the working head, and when a shift operation is performed, the user needs to press the locking switch with one hand for an unlocking purpose and rotate the working heads with the other hand to shift the working heads, which is not conducive to a shift by the user with a single hand and affects the operation experience of the user.

SUMMARY

An example provides a power tool including a body, an output assembly, a power mechanism, a switch assembly, and a battery pack. The body includes a first handle. The output assembly is disposed at an end portion of the body. The power mechanism includes an electric motor and a transmission unit which drive the output assembly to move. The switch assembly is disposed on the body and controls the power mechanism. The battery pack supplies power to the power mechanism. The output assembly includes a first output unit and a second output unit, where the first output unit and the second output unit are spaced apart, the first output unit is used for connecting a first working accessory, the second output unit is used for connecting a second working accessory, and the output assembly is rotatable about a shift axis to shift the first output unit to a working position or a non-working position. The battery pack is disposed at a bottom of the body, the battery pack includes a standing surface through which the power tool is capable of standing, and when the power tool stands, an orthographic projection of a center of gravity of the power tool on the standing surface is in the standing surface.

An example provides a power tool including a body, an output assembly, a power mechanism, a switch assembly, and a battery pack. The body includes a first handle. The output assembly is disposed at an end portion of the first handle. The power mechanism includes an electric motor and a transmission unit which drive the output assembly to move. The switch assembly is disposed on the body and controls the power mechanism. The battery pack supplies power to the power mechanism. The output assembly includes at least two output units spaced apart and used for connecting working accessories. The power tool further includes a shift mechanism including mounting portions, where each of the at least two output units is supported by a respective one of the mounting portions, and the shift mechanism is rotatably disposed at the end portion of the first handle about a shift axis. The battery pack is disposed at a bottom of the body, the battery pack includes a standing surface through which the power tool is capable of standing, and when the power tool stands, an orthographic projection of a center of gravity of the power tool on the standing surface is in the standing surface.

An example provides a power tool including a body, an output assembly, a power mechanism, and a switch assembly. The body includes a first handle. The output assembly is disposed at an end portion of the first handle. The power mechanism includes an electric motor and a transmission unit which drive the output assembly to move. The switch assembly is disposed on the body and controls the power mechanism. The output assembly includes at least two output units spaced apart and used for connecting working accessories. The power tool further includes a shift mechanism and a clutch mechanism. The shift mechanism includes mounting portions, where each of the at least two output units is supported by a respective one of the mounting portions, and the shift mechanism is rotatably disposed at the end portion of the first handle about a shift axis. The clutch mechanism is movably connected to the shift mechanism, where the clutch mechanism has a transmission position where an output unit among the at least two output units is in a transmission connection to the transmission unit and a disengagement position where the clutch mechanism is disengaged from the shift mechanism, where when the clutch mechanism is in the disengagement position, the shift mechanism is rotatable with respect to the body.

An example provides a power tool including a body, an output assembly, a power mechanism, and a switch assembly. The body includes a first handle. The output assembly is disposed at an end portion of the first handle. The power mechanism includes an electric motor and a transmission unit which drive the output assembly to move. The switch assembly is disposed on the body and controls the power mechanism. The output assembly includes at least two output units spaced apart and used for connecting working accessories, and the output assembly is rotatable about a shift axis to shift an output unit among the at least two output units to a working position or a non-working position. The power tool further includes a clutch mechanism movably connected to a shift mechanism, where the clutch mechanism has a transmission position where the output unit is in a transmission connection to the transmission unit and a disengagement position where the clutch mechanism is disengaged from the output assembly, where when the clutch mechanism is in the disengagement position, the output assembly is rotatable with respect to the body.

In some examples, the first handle is supportively connected between the output assembly and the battery pack.

In some examples, the first handle is disposed obliquely with respect to the shift axis.

In some examples, an included angle between an axis of the first handle and the shift axis is greater than or equal to 10° and less than or equal to 60°.

In some examples, an included angle between an axis of an output unit and the standing surface is greater than or equal to 0° and less than or equal to 90°.

In some examples, the output unit in the working position is higher than the output unit in the non-working position.

In some examples, an axis of the first handle and the shift axis are in different planes and form a cross shape.

In some examples, the electric motor is disposed in the first handle.

In some examples, the switch assembly includes a trigger for controlling the electric motor to start or stop.

In some examples, the trigger includes a front limit position when the trigger is not operated, where an operation span between the front limit position and a front end portion of an output unit among the at least two output units along an axial direction of the output unit is less than or equal to 130 mm.

In some examples, a span of a whole machine between a rear limit position of the body and the front end portion of the output unit along the axial direction of the output unit is less than or equal to 195 mm.

In some examples, the power tool further includes the shift mechanism including mounting portions, where each of the at least two output units is supported by a respective one of the mounting portions, and the shift mechanism is rotatably disposed at the end portion of the first handle.

In some examples, a mounting portion is a U-shaped support including a connection base and a pair of sidewalls, where the connection base is connected between the pair of sidewalls.

In some examples, the shift mechanism further includes a shift unit connected to the mounting portions, and the shift unit is an annular frame rotatable about the shift axis.

In some examples, the power tool further includes the clutch mechanism movably connected to the shift mechanism, where the clutch mechanism has the transmission position where the output unit is in the transmission connection to the transmission unit and the disengagement position where the clutch mechanism is disengaged from the output unit, where when the clutch mechanism is in the disengagement position, the output unit is rotatable with respect to the body.

In some examples, the shift mechanism guides the clutch mechanism to move between the transmission position and the disengagement position.

In some examples, the clutch mechanism or the transmission unit is at least partially disposed between two output units spaced apart.

In some examples, the clutch mechanism includes a shaft sleeve and a moving member, where the moving member is connected to the shaft sleeve and the shaft sleeve is movably connected to the transmission unit and driven by the moving member to be connected to or disengaged from the output unit.

In some examples, the transmission unit includes a transmission shaft, where the transmission shaft includes a clutch transmission portion, the shaft sleeve is movably connected to the clutch transmission portion, and the transmission shaft transmits torque to the shaft sleeve via the clutch transmission portion.

In some examples, the clutch transmission portion includes a noncircular shaft disposed on an end portion of the transmission shaft, and the noncircular shaft mates with and is connected to a noncircular hole on the shaft sleeve.

In some examples, the output unit, the shaft sleeve, and the transmission shaft are disposed coaxially, the transmission position and the disengagement position are distributed along an axial direction of the transmission shaft, and the moving member drives the shaft sleeve to move along the axial direction of the transmission shaft.

In some examples, the shift mechanism includes a locking portion and an unlocking portion, where when the clutch mechanism is in the transmission position, the clutch mechanism mates with the locking portion and restrains the shift mechanism from rotating, and when the clutch mechanism is in the disengagement position, the clutch mechanism is disengaged from the locking portion and allows the shift mechanism to rotate.

In some examples, the locking portion includes multiple straight slots, the unlocking portion is an annular slot, the annular slot and the shift axis are disposed coaxially, and an end portion of each of the multiple straight slots intersects with the annular slot.

In some examples, the moving member includes a first connection portion adapted to be inserted into a straight slot and an annular slot, where the annular slot forms the disengagement position and the straight slot forms the transmission position.

In some examples, the shift mechanism further includes a shift unit connected to the mounting portions, and the shift unit is an annular frame rotatable about the shift axis.

In some examples, the shift unit is the annular frame rotatable about the shift axis.

In some examples, a locking portion includes locking slots distributed along a radial direction of the annular frame, where one of the locking slots causes the clutch mechanism to be in the transmission position.

In some examples, the shift mechanism is a shell-shaped structure and provided with an opening at a bottom of the shift mechanism.

In some examples, the shift unit is disposed at the opening.

In some examples, the shift mechanism is a U-shaped support including a connection base and a pair of sidewalls, where the connection base is connected between the pair of sidewalls.

In some examples, the clutch mechanism or the transmission unit is at least partially disposed between the pair of sidewalls.

In some examples, a torque transmission member is provided at another end of the shaft sleeve, and the output unit includes a clamping portion and a connection portion, where the clamping portion is used for mounting a working accessory, and the connection portion is in the transmission connection to the torque transmission member.

In some examples, the torque transmission member includes engagement slots disposed on the shaft sleeve, and the connection portion includes a transmission claw disposed on the output unit, where the engagement slots are adapted for insertion of the transmission claw.

In some examples, the body further includes a support housing disposed at a top of the first handle, where the support housing includes an output port and a rotation guide unit, and a mounting portion is slidably connected to the rotation guide unit.

In some examples, the power tool further includes a protective housing connected to the body, where a protective space is formed between the protective housing and the body and used for accommodating a working accessory in the non-working position.

In some examples, the transmission unit further includes a first bevel gear and a second bevel gear which mesh with each other, where the first bevel gear is coaxially connected to the transmission shaft.

In some examples, the body further includes a second handle, where the second handle is disposed at a rear end of the first handle.

In some examples, the battery pack is disposed at a bottom of the first handle and a bottom of the second handle, the battery pack includes the standing surface through which the power tool is capable of standing, and when the power tool stands, the orthographic projection of the center of gravity of the power tool on the standing surface is in the standing surface.

In some examples, a cross-section of the first handle and a cross-section of the second handle at any same height have unequal dimensions, where a height direction refers to a direction perpendicular to the standing surface.

In some examples, the switch assembly is disposed on the second handle.

In some examples, the power tool further includes a storage mechanism for storing unused accessories, where the storage mechanism is a storage bin or a storage clip, the storage bin is disposed in the body and has a lid which is openable and closeable, and the storage clip has slots for clamping the accessories.

The power tool in the examples of the present application has a proper center of gravity and is stable during use, structures inside a housing are compact, and the tool is more miniature. In the present application, operation steps of a user are simplified so that the user can perform a disconnection, a connection, and a shift with a single hand, improving user experience.

DETAILED DESCRIPTION

Figure 1:
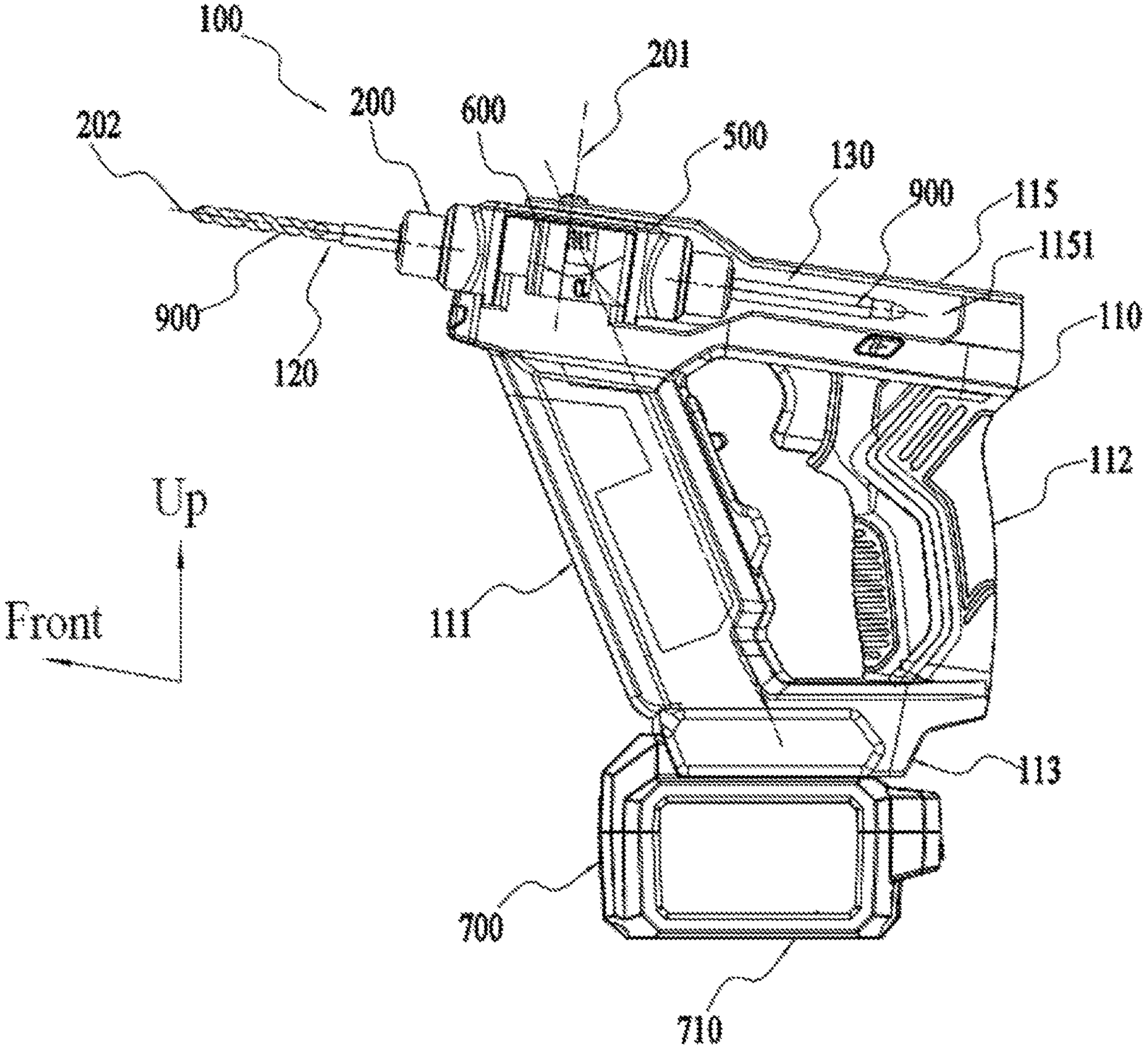
FIG. 1 is a structure view of a power tool in the present application.

As shown in FIG. 1, the present application provides a power tool 100, for example, a handheld power tool, where the power tool 100 in an example of the present application is a handheld dual-output electric drill.

In addition, although this example relates to the handheld power tool, it is to be understood that the present application is not limited to the disclosed examples but is applicable to other types of power tools, including, but not limited to, other tools which need to clamp working accessories, such as an electric drill.

As shown in FIG. 1, the power tool 100 includes a body 110, an output assembly 200, a power supply device, and a switch assembly 800. The power supply device in the example of the present application is a battery pack 700. In other examples, the power tool 100 may be an alternating current tool, and in this case, the power supply device includes a cable and a plug which are connected to mains electricity.

As shown in FIG. 1, the body 110 in the example of the present application includes a first handle 111 and a second handle 112, where the first handle 111 and the second handle 112 are disposed along a front and rear direction of the body 110, and the second handle 112 is disposed at a rear end of the first handle 111. The front and rear direction mentioned in this example refers to that when the power tool is gripped, a direction which a user faces is the front, and a direction opposite to the direction which the user faces is the rear.

A cross-section of the first handle 111 and a cross-section of the second handle 112 at any same height have unequal dimensions, where a height direction refers to a direction perpendicular to a standing surface.

In this example, the battery pack 700 is disposed at a bottom end of the first handle 111 and a bottom end of the second handle 112, and optionally, the bottom end of the first handle 111 and the bottom end of the second handle 112 are connected through the battery pack. A connection base 113 adapted for mounting the battery pack 700 is further provided at the bottom end of the first handle 111 and the bottom end of the second handle 112, and conductive terminals electrically connected to the battery pack 700 are disposed on the connection base 113. The battery pack 700 includes a standing surface 710, where the tool 100 may stand on a surface of a worktable through the standing surface 710 of the battery pack 700, and in the example of the present application, an orthographic projection of a center of gravity of the power tool 100 on the standing surface 710 is in the standing surface 710. With the preceding arrangement, the case can be avoided where the tool stands unsteadily due to an unsteady center of gravity of the tool, thereby avoiding a safety hazard caused by the fall of the tool. When the tool stands on the worktable, part of a bottom surface of the battery pack 700 is in contact with an operation table and constitutes the standing surface 710. In an example, if the bottom surface of the battery pack 700 is a plane, the bottom surface of the battery pack 700 constitutes the standing surface 710.

The output assembly 200 in the example of the present application is disposed at a front end of the body 110, where the output assembly 200 includes at least two output units 210 spaced apart and used for connecting working accessories 900. Referring to FIG. 1, an output unit 210 has a working position 120 and a non-working position 130, where the working position 120 is on a front side of the output assembly 200, and any other position except the front side may constitute the non-working position. The output assembly 200 has a shift axis 201 about which the output assembly 200 rotates, where the output assembly 200 rotates about the shift axis 201 and can rotate different output units 210 on the output assembly 200 to the working position 120 or the non-working position 130.

Figure 2:
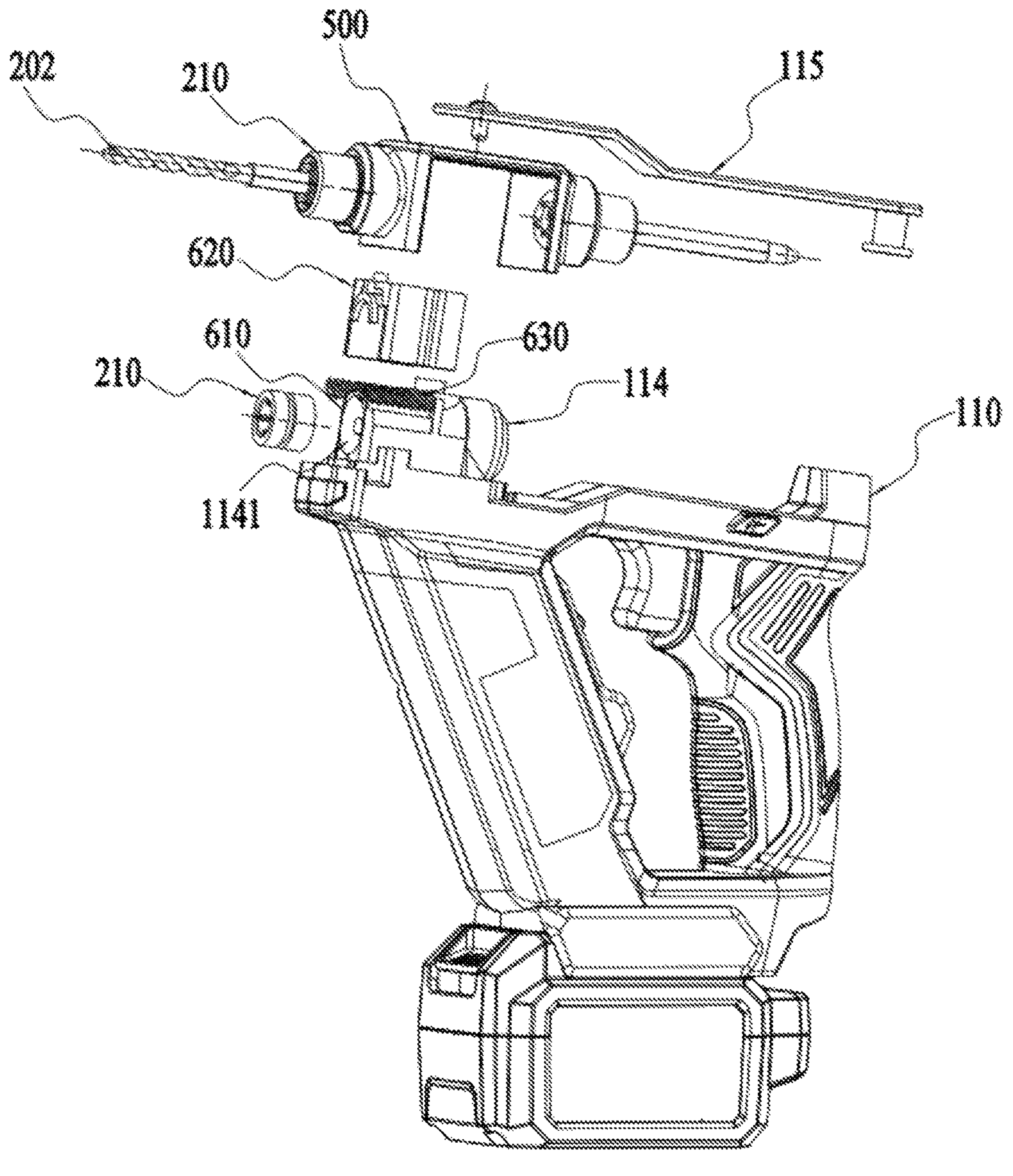
FIG. 2 is a schematic view showing the assembly of the power tool shown in FIG. 1.
Figure 3:
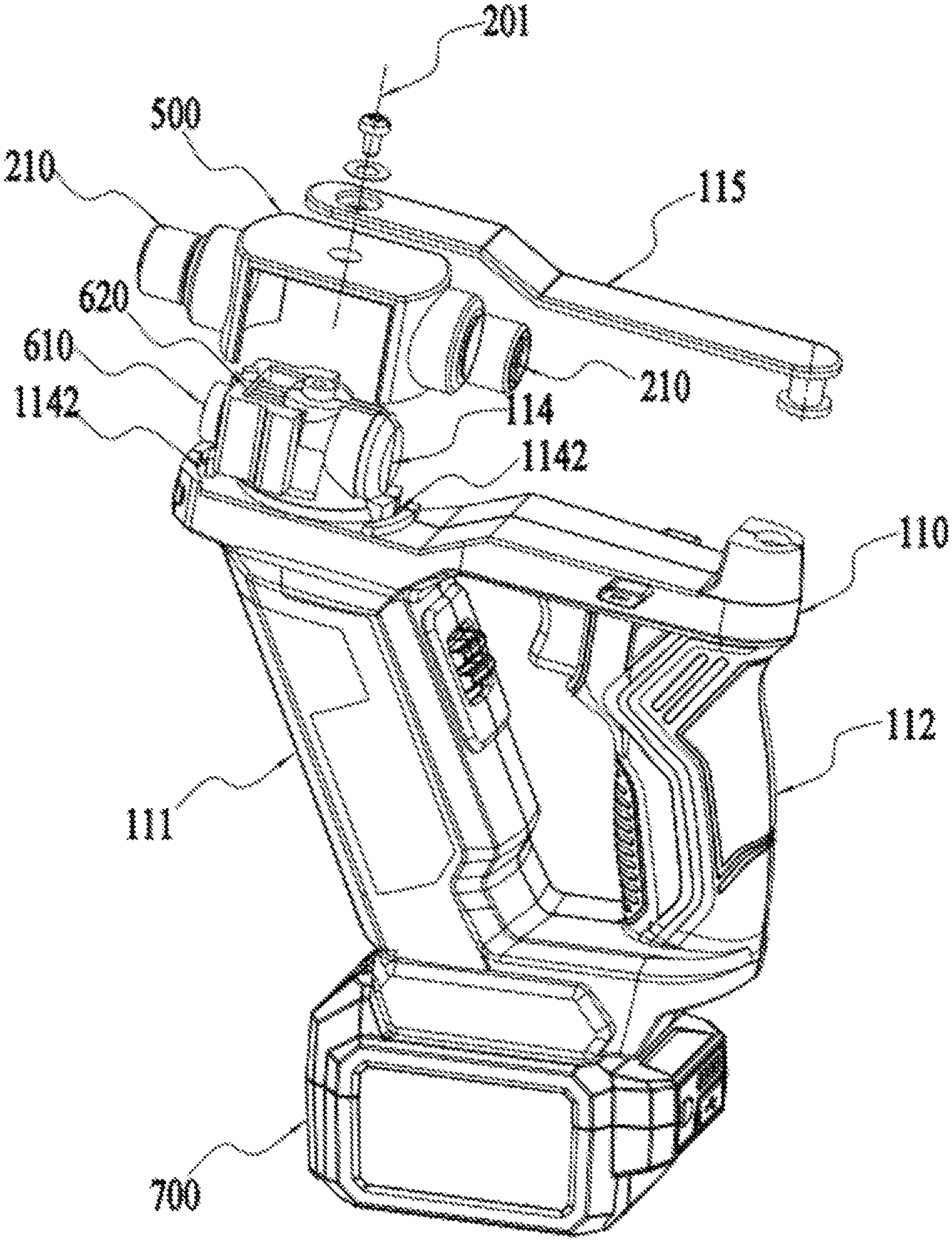
FIG. 3 is a schematic view showing the assembly of the power tool shown in FIG. 1 from another angle.

As shown in FIGS. 2 and 3, the output unit 210 in this example is in the shape of a cylinder whose axis coincides with an output axis 202. In this example, two output units 210 are disposed opposite to each other. Therefore, in the example of the present application, the front side of the output assembly 200 is the working position 120, and a rear side corresponding to the front side is the non-working position 130. When one of the working accessories 900 needs to be used, the output unit 210 corresponding to the one of the working accessories 900 is rotated to the front side. An end portion of the output unit 210 is provided with a clamping portion 211 for clamping a working accessory 900, where the working accessory 900 in this example includes a drill bit, a screwdriver bit, and the like. One of the two output units 210 is configured to be used for clamping the drill bit, and the other output unit 210 is configured to be used for clamping the screwdriver bit. As an alternative example, the two output units 210 may be used for clamping two drill bits or two screwdriver bits, which is not limited.

Figure 4:
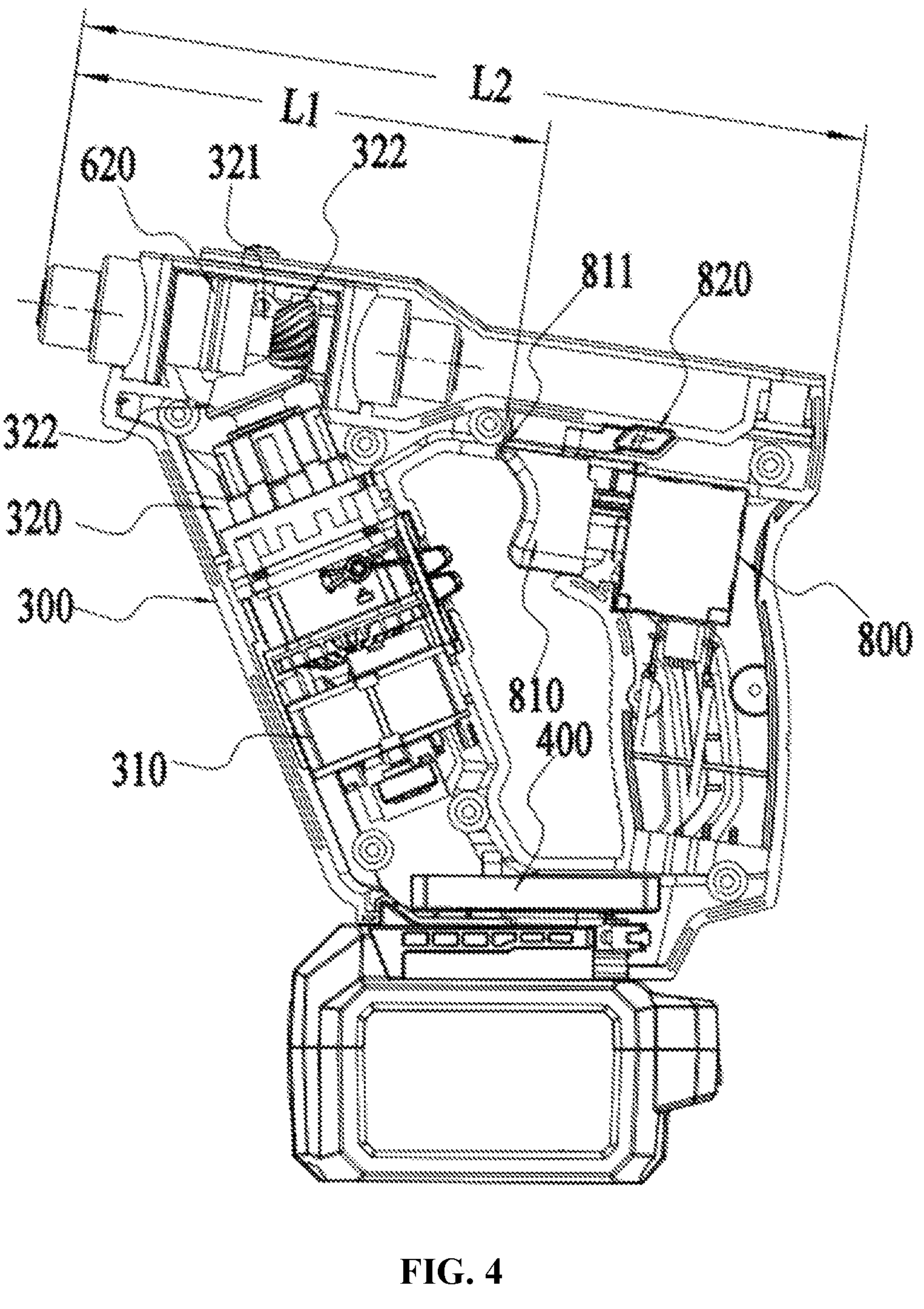
FIG. 4 is a structure view of the power tool shown in FIG. 2 with part of a housing removed.

Referring to FIG. 4, a power mechanism 300 and a control mechanism 400 are disposed in the body 110, where the power mechanism 300 is used for driving the output unit 210 to move, the control mechanism 400 is used for controlling the running of the power mechanism 300, the power mechanism 300 includes an electric motor 310 and a transmission unit 320, and an output end of the electric motor 310 is in a transmission connection to the output unit 210 through the transmission unit 320.

As shown in FIG. 1, the output unit 210 has the output axis 202 about which the output unit 210 rotates, where the two output units in the example of the present application are disposed coaxially along a direction of the output axis 202, and the output axis 202 is disposed obliquely with respect to the standing surface 710. For example, as shown in FIG. 1, the output unit 210 in the working position 120 is higher than the output unit 210 in the non-working position 130. In this example, referring to FIG. 1, the output axis 202 is approximately perpendicular to the shift axis 201, and the output unit 210 extends in a direction approximately perpendicular to the shift axis 201. In other words, the output unit 210 rotates in a rotation plane approximately perpendicular to the shift axis 201, and the rotation plane is disposed obliquely with respect to the standing surface 710.

In the example of the present application, an axis of the first handle 111 and the shift axis 201 are configured to intersect with each other. For example, the axis of the first handle 111 and the shift axis 201 may be in different planes and form a cross shape or may intersect with each other in the same plane. When the axis of the first handle 111 and the shift axis 201 are in the different planes and form the cross shape, an included angle α between the axis of the first handle 111 and the shift axis 201 is greater than or equal to 0° and less than or equal to 60°. When the axis of the first handle 111 and the shift axis 201 intersect with each other in the same plane, the included angle α between the axis of the first handle and the shift axis is greater than or equal to 10° and less than or equal to 60°.

Referring to FIG. 4, the electric motor 310 is disposed in the first handle 111, where the first handle 111 is supportively connected between the output assembly 200 and the battery pack 700 and disposed obliquely with respect to the shift axis 201. Referring to FIG. 2, in the example of the present application, the included angle α between the axis of the first handle 111 and the shift axis 201 is greater than or equal to 10° and less than or equal to 60°, and an included angle β between the output axis 202 of the output unit 210 and the standing surface 710 is greater than or equal to 0° and less than or equal to 90°. The output axis 202 is disposed obliquely with respect to the standing surface 710 and the included angle between the first handle 111 and the shift axis 201 is set in the preceding range so that the first handle is longer than the second handle, thereby placing most mechanisms in the first handle. On the one hand, on the basis that transmission performance is ensured, a dimension of the whole machine in an axial direction is reduced as much as possible so that the whole machine has a more compact structure and a smaller dimension. On the other hand, the first handle 111 is disposed obliquely and the electric motor 310 is disposed in the first handle 111 so that the electric motor 310 is closer to the output unit 210, and the center of gravity of the whole machine is adjusted forward through the weight of the electric motor 310 and finally the orthographic projection of the center of gravity on the standing surface 710 is in the standing surface 710 so that the whole machine is more harmonious and steadier. In other examples, as long as the projection of the center of gravity of the tool 100 on the standing surface 710 is in the standing surface 710, the first handle 111 may be perpendicular to the standing surface 710, and in this case, the shift axis 201 is also oblique with respect to the standing surface 710.

The control mechanism 400 mainly includes a control circuit board and is electrically connected to the switch assembly 800 and the electric motor 310 separately. The switch assembly 800 controls, through the control mechanism 400, the electric motor 310 to be on or off to switch a working state of the whole machine. The switch assembly 800 is disposed on the body 110, for example, the switch assembly 800 is disposed on the second handle 112, and the control mechanism 400 is disposed in the connection base 113. The control mechanism 400 is disposed in the connection base 113 so that the control mechanism is in the middle of the switch assembly 800, the electric motor 310, and the battery pack 700, which makes circuit arrangement easier, saves a space occupied by lines, and further reduces the dimension of the whole machine.

Referring to FIG. 4, the switch assembly 800 includes a trigger 810 and a locking button 820, where the trigger 810 is electrically connected to the control mechanism 400 and used for controlling the electric motor 310 to start or stop. The trigger 810 has an original position where the trigger 810 is not operated by the user and an activation position where the trigger 810 is pressed to activate the electric motor 310, where the locking button 820 may be used for locking the trigger 810 in the activation position. As shown in FIG. 4, an operation span L1 of the trigger 810 is less than or equal to 130 mm, where the operation span refers to a distance between a forefront of the trigger 810 in the original position 811 and a front end portion of the output unit 210 along an axial direction of the output unit. In an example, a span L2 of the whole machine between a rear limit position of the body and the front end portion of the output unit 210 is less than or equal to 195 mm, where the span L2 of the whole machine refers to a distance between a rear end portion of the body and the front end portion of the output unit 210 along the axial direction of the output unit. In this example, the span L2 of the whole machine is approximately 175 mm, and the height of the whole machine is about 167 mm, where the height refers to a longitudinal distance from a top end of the body to the standing surface 710.

If the operation span L1 is excessively long, the working accessory 900 is liable to have an unsteady state such as a swing in a working process, which increases the difficulty of the user in manipulation and is not conducive to operation of the user with a single hand. Therefore, the operation span is set in the preceding range, which is conducive to reducing the difficulty of the user in manipulation, facilitates the operation of the user with a single hand, and improves user experience.

The power tool in the example of the present application further includes a shift mechanism 500 and a clutch mechanism 600. As shown in FIGS. 1 to 4, the shift mechanism 500 is rotatably disposed at a top of the first handle 111 and rotates about the shift axis 201, where the clutch mechanism 600 is movably connected to the shift mechanism 500. In other examples of the present application, the shift mechanism may not be provided, and the output assembly actually has a shift function. That is, the output assembly and the shift mechanism are integrated so that the output assembly includes a structure which can implement locking and unlocking actions with the clutch mechanism.

The shift mechanism 500 includes mounting portions 510 and a locking element, where a mounting portion 510 is used for mounting and supporting the output unit 210, and the locking element can implement the movement of the clutch mechanism 600 between a transmission position and a disengagement position.

Figure 5:
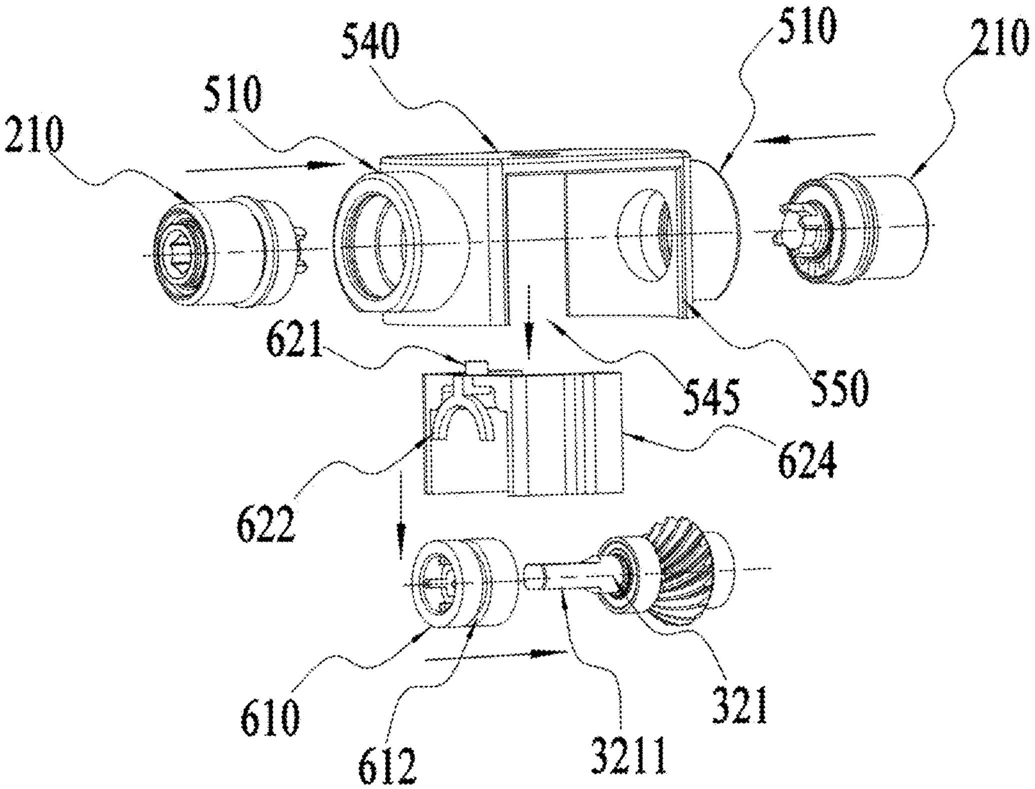
FIG. 5 is a schematic view showing the assembly of output units, a shift mechanism, a clutch mechanism, and a transmission unit in the present application.
Figure 6:
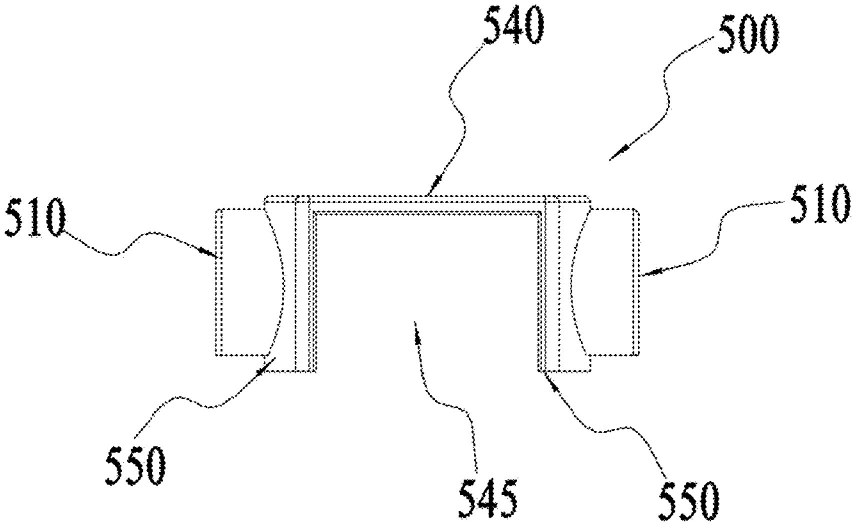
FIG. 6 is a front view of a shift mechanism in the present application.
Figure 7:
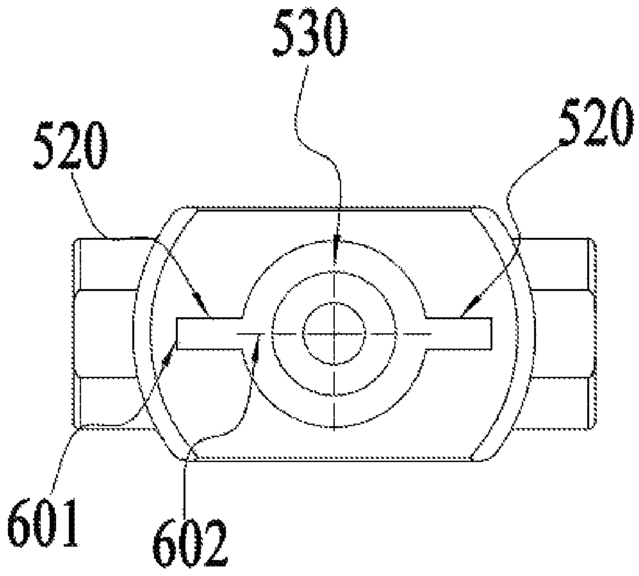
FIG. 7 is a bottom view of the shift mechanism shown in FIG. 6.

As shown in FIGS. 5 to 7, in an example, the locking element includes a locking portion 520 and an unlocking portion 530, where the locking portion 520 restrains the shift mechanism 500 from rotating with respect to the clutch mechanism 600, and the unlocking portion 530 allows the shift mechanism 500 to rotate.

Referring to FIG. 7, the clutch mechanism 600 has a transmission position 601 where the output unit 210 is in the transmission connection to the transmission unit 320 and a disengagement position 602 where the transmission unit 320 is disengaged from the output unit 210, and the shift mechanism 500 guides the clutch mechanism 600 to move between the transmission position 601 and the disengagement position 602, where the transmission position 601 and the disengagement position 602 are distributed along an axial direction of a transmission shaft 321.

As shown in FIGS. 5 and 6, the shift mechanism in the example of the present application is a U-shaped support including a connection base 540 and a pair of sidewalls 550, where the connection base 540 is disposed between the pair of sidewalls 550 such that U-shaped openings 545 opposite to each other are formed between the pair of sidewalls. The connection base 540 is pivotally connected to a support housing 114 at a top of the body 110, where the support housing 114 is disposed at the top of the first handle 11. Referring to FIGS. 2 and 3, the support housing 114 includes an output port 1141 via which the clutch mechanism 600 is connected to the transmission shaft 321, and the shift mechanism 500 is pivotally connected to the support housing 114.

As shown in FIGS. 5 and 6, the mounting portion 510 is a support boss disposed on a sidewall 550, where a circular mounting hole is disposed on the support boss and penetrates through the support boss to fit the output unit 210, and the output unit 210 is supported in the mounting hole of the support boss.

As shown in FIG. 5, the clutch mechanism 600 includes a shaft sleeve 610 and a moving member 620, where the moving member 620 is connected to the shaft sleeve 610, and the shaft sleeve 610 is movably connected to the transmission shaft 321 and may be connected to or disengaged from the output unit 210. The output unit 210, the shaft sleeve 610, and the transmission shaft 321 are disposed coaxially, and the moving member 620 drives the shaft sleeve 610 to move along the axial direction of the transmission shaft 321.

Figure 8:
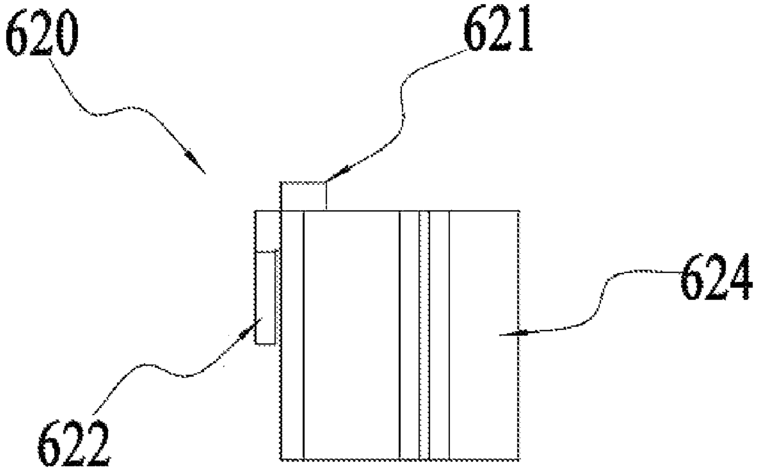
FIG. 8 is a front view of a moving member in the present application.
Figure 9:
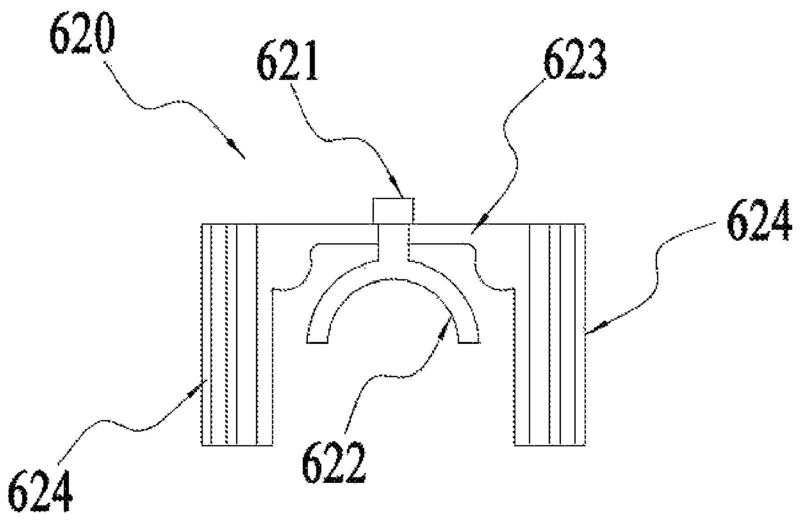
FIG. 9 is a left view of the moving member shown in FIG. 8.
Figure 10:
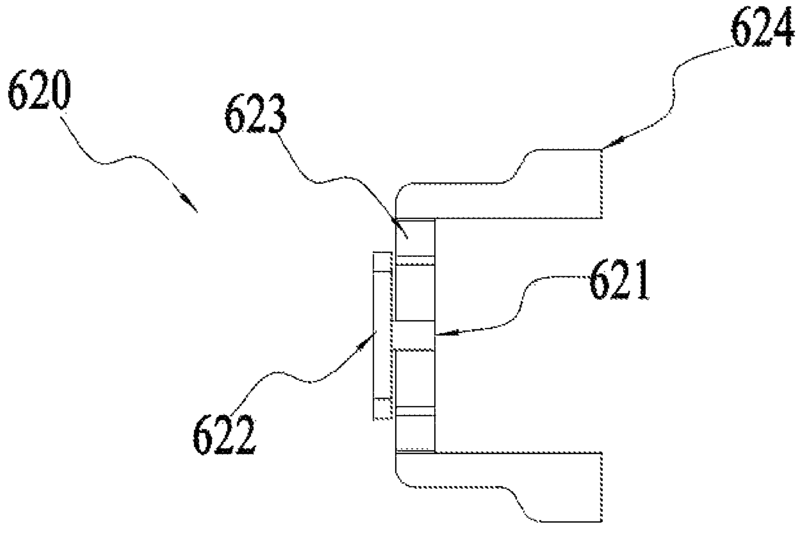
FIG. 10 is a top view of the moving member shown in FIG. 8.
Figure 11:
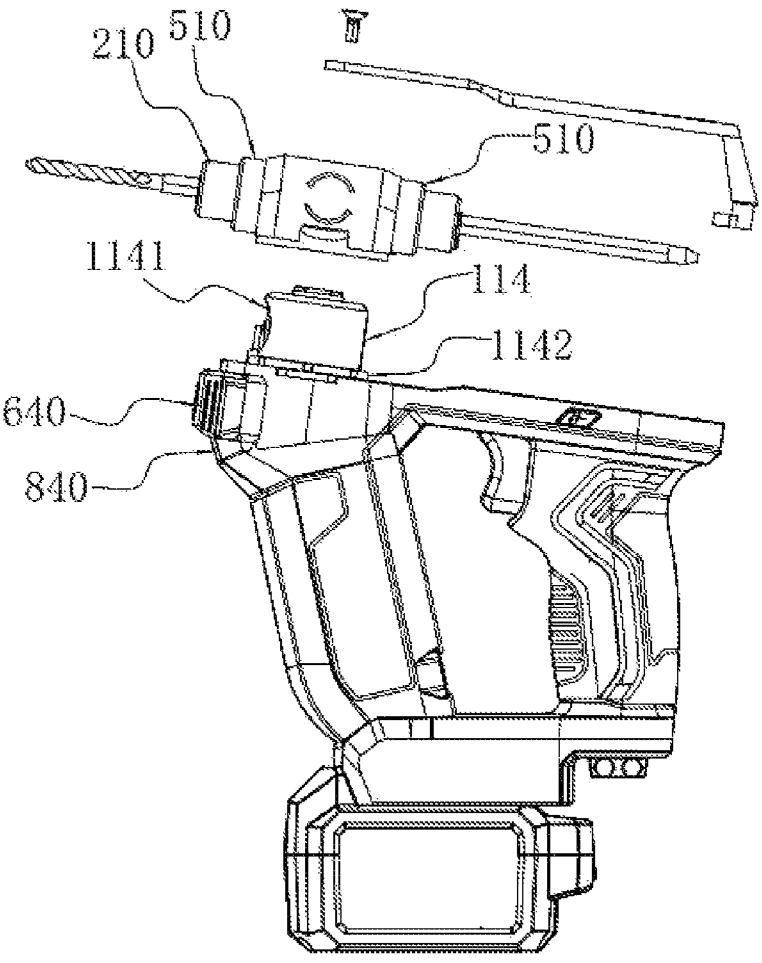
FIG. 11 is a structure view of another example of a shift mechanism in the present application.

Referring to FIGS. 8 to 10, the moving member 620 in the example of the present application includes a first connection portion 621 and a second connection portion 622, where the first connection portion 621 is slidably connected to the locking portion 520 and the unlocking portion 530, and the locking portion 520 guides the moving member 620 to move between the transmission position 601 and the disengagement position 602; and the second connection portion 622 is connected to the shaft sleeve 610 and the shaft sleeve 610 is driven to move synchronously through the second connection portion 622.

Figure 21:
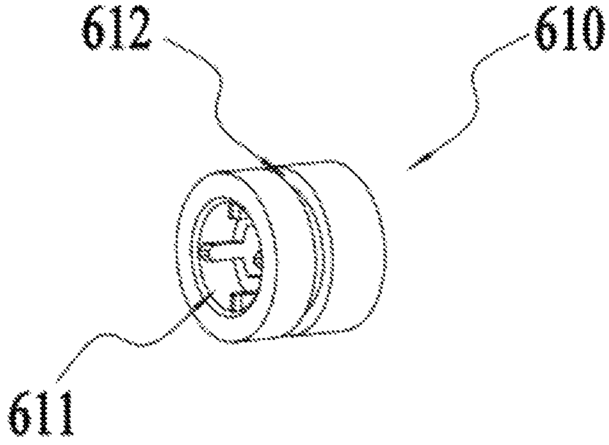
FIG. 21 is a structure view of a shaft sleeve in the present application.
Figure 22:
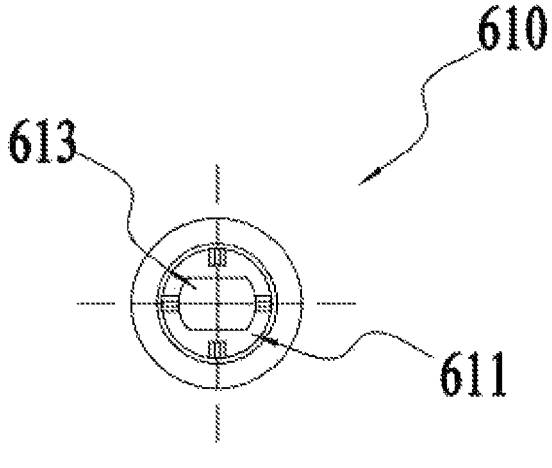
FIG. 22 is a left view of the shaft sleeve shown in FIG. 21.

As shown in FIG. 3, the moving member 620 is disposed across the shaft sleeve 610 along a radial direction. Referring to FIGS. 8 to 10, the moving member 620 includes a moving member body 623, the first connection portion 621 is a protrusion disposed at a top of the moving member body 623, and the second connection portion 622 is a claw disposed below the moving member body 623. As shown in FIG. 21, a groove 612 is disposed on the shaft sleeve 610 corresponding to the claw, for example, the groove 612 is an annular groove cut along an outer circumference of the shaft sleeve 610, where the claw is clamped in the groove 612.

Referring to FIGS. 8 to 10, the moving member 620 in the example of the present application is further provided with operation portions 624 for the user to operate, where two operation portions are provided on two radial sides of the support housing 114 separately and exposed via the openings 545 of the shift mechanism 500 to be operated by the user, and the user operates the operation portions 624 to shift the clutch mechanism 600.

As shown in FIG. 2, the clutch mechanism 600 in the example of the present application further includes a biasing member 630 disposed at an end portion of the moving member 620, where after the user releases the operation portions 624, the moving member 620 can return to the transmission position 601 under the action of the biasing member 630.

As shown in FIG. 7, in the example of the present application, the locking portion 520 and the unlocking portion 530 are each a slot disposed on an inner side of the connection base 540, where the first connection portion 621 is adapted to be inserted into the slot and move along the slot. The locking portion 520 includes multiple straight slots disposed along an axial direction of the mounting portion 510, and the unlocking portion 530 is an annular slot disposed in the center of the connection base 540, where the straight slots extend along the axial direction of the mounting portion 510 separately, and the annular slot and the shift axis 201 are disposed coaxially. An end portion of each of the multiple straight slots intersects with the annular slot, where the disengagement position 602 is from an intersection between a straight slot at one end and the annular slot, through the annular slot, and to an intersection between a straight slot at the other end and the annular slot, and an end of the straight slot facing away from the annular slot forms the transmission position 601.

When the first connection portion 621 is at the end of the straight slot facing away from the annular slot, the clutch mechanism 600 is in the transmission position 601. In this case, the shaft sleeve 610 is driven by the moving member 620 to extend out via the output port 1141 of the support housing 114 and be connected to the output unit 210. Since the protrusion is in the straight slot, the shift mechanism 500 is restrained by the straight slot and the clutch mechanism from rotating with respect to the clutch mechanism 600. When the protrusion is in the position where the straight slot intersects with the annular slot, in other words, the protrusion is in the annular slot, the clutch mechanism 600 is in the disengagement position 602, and the shaft sleeve 610 is driven by the moving member 620 to be retracted into the support housing 114 and disengaged from the output unit 210. Since the protrusion is in the annular slot, the shift mechanism 500 may rotate with respect to the clutch mechanism 600.

As shown in FIG. 3, a rotation guide unit 1142 is further disposed on the support housing 114, and the shift mechanism 500 is slidably connected to the rotation guide unit 1142. For example, as shown in the figure, the rotation guide unit 1142 in the example of the present application is a slide slot disposed on the support housing 114, and bottoms of the pair of sidewalls 550 of the shift mechanism 500 are slidably connected to the slide slot.

As shown in FIG. 4, the transmission unit 320 includes a gearbox including a bevel gearset 322 and the transmission shaft 321. Since the first handle 111 in this example is disposed obliquely with respect to the standing surface 710, the gearbox optionally includes the bevel gearset. In other examples, the gearbox may include any other type of transmission structure, which is not limited. The bevel gearset 322 includes a first bevel gear and a second bevel gear, where the first bevel gear and the transmission shaft 321 are coaxially connected to each other and disposed together between the two output units spaced apart.

As shown in FIG. 5, the transmission shaft 321 includes a clutch transmission portion 3211, where the shaft sleeve 610 is slidably connected to the clutch transmission portion 3211, and the transmission shaft 321 transmits torque to the shaft sleeve 610 via the clutch transmission portion 3211 such that the shaft sleeve 610 rotates synchronously with the transmission shaft 321.

Referring to FIG. 5, the clutch transmission portion is a noncircular shaft disposed on an end portion of the transmission shaft 321, that is, the clutch transmission portion has a noncircular cross-section, and a noncircular hole mating with the noncircular shaft is disposed on the shaft sleeve 610 corresponding to the clutch transmission portion. The transmission shaft 321 in this example includes a flat shaft 3211 in the transmission connection to the shaft sleeve 610, and a flat hole 613 mating with the noncircular shaft is disposed on the shaft sleeve 610 corresponding to the transmission shaft 321. The flat shaft 3211 mates with the flat hole 613 such that the shaft sleeve 610 is allowed to axially slide with respect to the transmission shaft 321 or rotate with the transmission shaft 321. As an alternative example, the clutch transmission portion 3211 may be a plane disposed on an outer circumference of the transmission shaft 321, that is, the plane may be cut on the outer circumference of the transmission shaft 321 along the axial direction of the transmission shaft 321 as long as the transmission shaft 321 forms a noncircular cross-section, and a hole having the same shape as the noncircular cross-section is disposed on the shaft sleeve.

Figure 20:
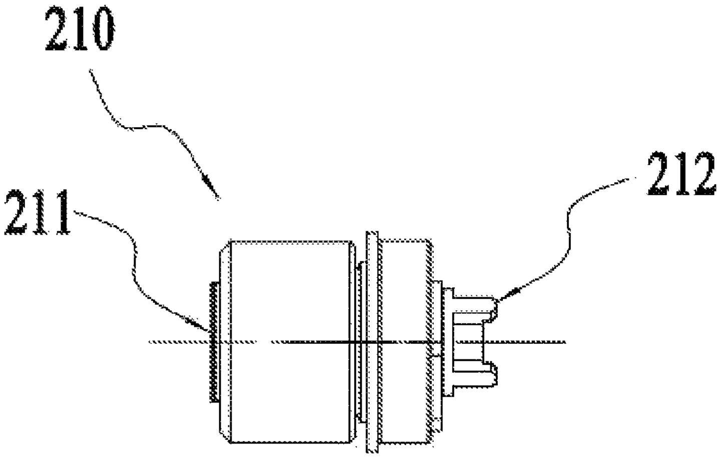
FIG. 20 is a front view of the output unit shown in FIG. 19.

A torque transmission member is provided at the other end of the shaft sleeve 610 in the example of the present application, and a connection portion is provided at the other end of the output unit 210 without the clamping portion, where the connection portion in the transmission connection to the torque transmission member. For example, as shown in FIGS. 20 and 21, the connection portion is a transmission claw 212 disposed on the end portion of the output unit 210, and the torque transmission member is engagement slots 611 disposed on an inner circumferential surface of the shaft sleeve 610, where the engagement slots 611 are disposed in correspondence with the transmission claw 212 and adapted for the insertion of the transmission claw 212, thereby implementing the rotation of the output unit 210 with the shaft sleeve 610.

As shown in FIGS. 1 to 3, the power tool 100 in the example of the present application further includes a protective housing 115 connected to the body 110, where a protective space 1151 is formed between the protective housing 115 and the body 110 and used for accommodating and protecting the working accessory 900 in the non-working position. In an example, the protective housing 115 is disposed only at a top of the output assembly, where one end of the protective housing 115 is pivotally connected to a shift shaft of the shift mechanism 500, and the other end of the protective housing 115 is connected to the body. The protective housing 115 has a stepped shape to fit the shape of the shift mechanism and the shape of the working accessory in the non-working position so that the overall dimension of the housing is more compact.

As shown in FIGS. 3 and 4, the rotation guide unit 1142 is further disposed on the support housing 114, and the shift mechanism 500 is slidably connected to the rotation guide unit 1142. Optionally, the rotation guide unit 1142 in the example of the present application is the slide slot disposed on the support housing 114, and circular plate stiffeners slidably connected to the slide slot are formed at a bottom of the connection base 540 of the shift mechanism 500.

Figure 23:
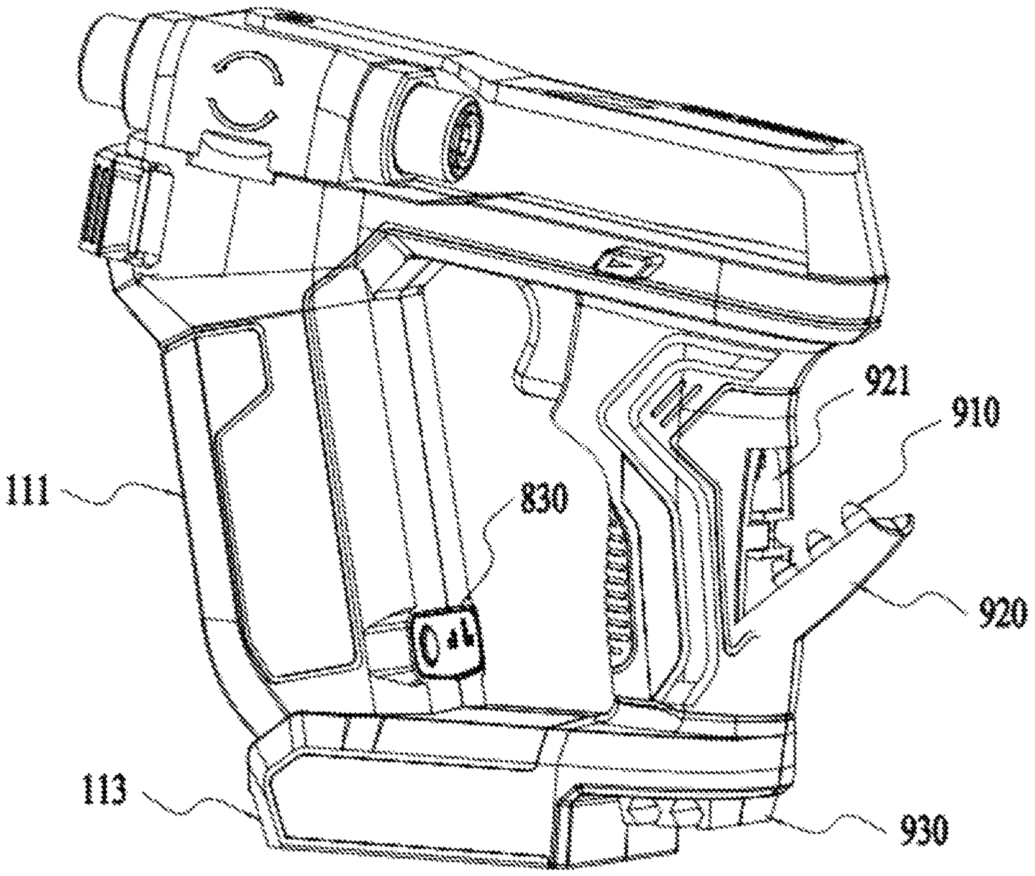
FIG. 23 is a structure view of a storage mechanism in the present application.

As shown in FIG. 23, the power tool in the present application further includes a switching key 830 for switching an output rotational speed of the electric motor. The switching key 830 is disposed on the first handle 111, for example, the switching key 830 is disposed on a side of the first handle 111 facing the second handle 112, where the side of the first handle 111 facing the second handle 112 is equivalent to a side of the first handle 111 facing the user, thereby facilitating the operation of the user. The switching key 830 is integrated with indicator lights indicating a current state of the rotational speed of the electric motor. In this example, the electric motor has at least two switchable rotational speeds, and at least two corresponding indicator lights are provided, where the indicator lights have different lengths for distinguishing different rotational speeds of the electric motor. In other examples, colors of the indicator lights may be used for distinguishing the different rotational speeds of the electric motor.

As shown in FIG. 23, the power tool in the example of the present application further includes a storage mechanism for storing an accessory 910 to be used, a replaced accessory 910, or a spare accessory 910, where the storage mechanism is a storage bin 920 or a storage clip 930.

The storage bin 920 is disposed in a handle and has an openable lid and a storage space 921. In this example, the storage bin is disposed on a rear side of the second handle 112, the lid is opened toward the user, and the accessory 910 is placed in an engagement slot on an inner side of the lid or disposed in the storage space 921. In other examples, the storage bin 920 may be the preceding structure disposed in another position, a drawer-shaped structure, or the like, which is not limited herein.

The storage clip 930 is disposed on a surface of the housing, where the storage clip 930 has multiple slots where the accessories 910 are placed, and the accessories 910 are engaged in the slots. In an example, the storage clip 930 is made of soft rubber and disposed below the second handle 112 and behind the connection base 113.

When the power tool is used normally, the moving member 620 is in the transmission position 601, and the shaft sleeve 610 is in the transmission connection to the output unit 210 at the front end. In this case, the torque of the transmission shaft 321 of the gearbox may be normally transmitted to the output unit 210.

When the working accessory 900 needs to be shifted, the user manually pushes the operation portions 624 of the clutch mechanism 600 to cause the moving member 620 to move toward the rear end along the straight slot, and the shaft sleeve 610 is disengaged from the output unit 210 in the working position. When the moving member 620 moves to a top end of the straight slot and cannot continue to move, the moving member 620 is in the annular slot (that is, the moving member 620 is in the disengagement position), and at this time, the user may manually rotate the shift mechanism 500 to rotate the output unit in the working position to the non-working position and rotate the output unit in the non-working position to the working position.

When the user releases the operation portions 624, the moving member 620 automatically returns to the transmission position under the action of the biasing member, the shaft sleeve 610 is in the transmission connection to the output unit in the working position, and the output unit may work normally.

In the present application, the preceding shift mechanism and the preceding clutch mechanism which are linked to each other are provided such that the clutch mechanism and the shift mechanism are configured to collaborate. The clutch mechanism is in the transmission connection to the body and an output mechanism so that the output is transmitted or terminated. In addition, the clutch mechanism and the shift mechanism are linked to each other through the first connection portion, the locking portion, and the unlocking portion so that a shift and a rotation are allowed to be performed while a connection and a disconnection are performed. Thus, operation steps of the user are simplified so that the user can perform the disconnection, the connection, and the shift with a single hand, improving the user experience.

In another example of the present application, the locking element includes a shift unit 570, where the shift unit 570 includes a locking slot 571 for restraining the shift mechanism 500 from rotating with respect to the body.

As shown in FIGS. 11 to 18, the shift mechanism 500 in this example is a shell structure. Optionally, the shift mechanism 500 is a T-shaped sleeve. A pair of mounting portions 510 are disposed at two ends of the T-shaped sleeve 560 along a transverse direction, where a cavity in the sleeve 560 is used for accommodating the transmission shaft, part of a transmission gear, and the shift unit 570, and a cavity in the mounting portion 510 is used for accommodating part of the output unit 210. The shift unit 570 may be disposed at a bottom end of the sleeve 560 and fixedly or detachably connected to the bottom end of the sleeve.

Figure 16:
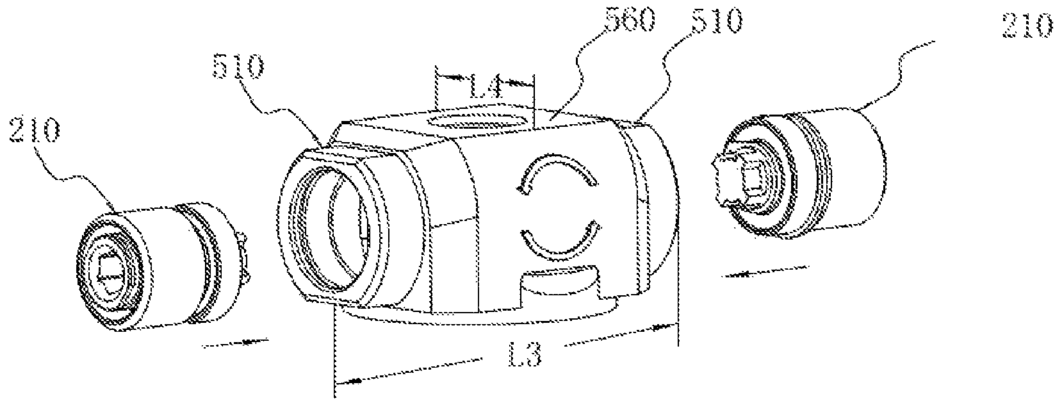
FIG. 16 is a schematic view showing the assembly of the shift mechanism and output units in the example in FIG. 11.

In the example of the present application, a dimension of the sleeve 560 along a direction of the output axis 202 is less than or equal to 100 mm. It is to be understood that as shown in FIG. 16, a dimension L3 of the sleeve 560 in the front and rear direction is less than or equal to 100 mm. A dimension of the sleeve 560 along a direction perpendicular to both the output axis 202 and the shift axis 201 is less than or equal to 45 mm. It is to be understood that as shown in FIG. 16, a maximum dimension L4 of the sleeve 560 along a left and right direction is less than or equal to 45 mm.

Figure 12:
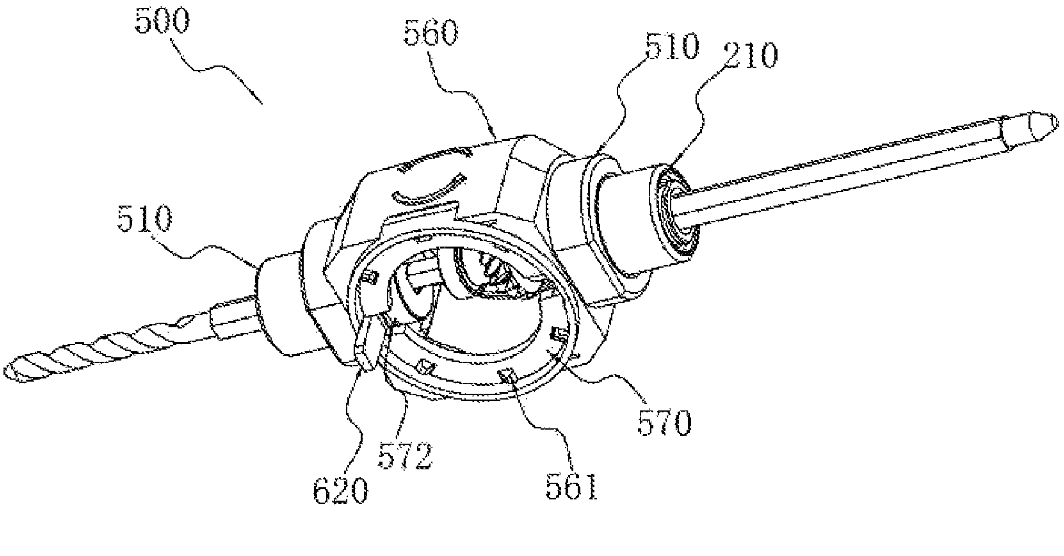
FIG. 12 is a schematic view of output units, the shift mechanism, and a clutch mechanism in the example in FIG. 11, which are assembled.
Figure 13:
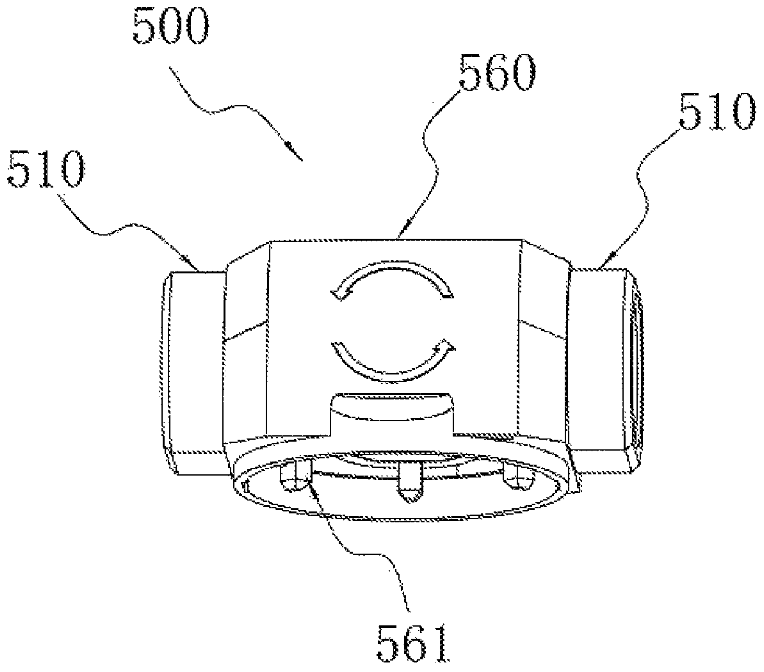
FIG. 13 is a structure view showing the mounting of the shift mechanism in the example in FIG. 11.

Referring to FIGS. 12 and 13, the support housing 114 is disposed at the top of the first handle 111, the support housing 114 includes the output port 1141 via which the clutch mechanism 600 is connected to the output unit 210, and the shift mechanism 500 is pivotally connected to the support housing 114. In an example, the sleeve 560 is sleeved outside the support housing 114 and rotatable around the support housing 114. Therefore, the sleeve 560 and the support housing 114 are approximately disposed coaxially, and an axis of the sleeve 560 approximately coincides with the shift axis 201.

The sleeve 560 includes support bosses disposed on the mounting portions 510, where a circular mounting hole is disposed on a support boss and penetrates through the support boss to fit the output unit 210, and the output unit 210 is supported in the mounting hole of the support boss.

Figure 18:
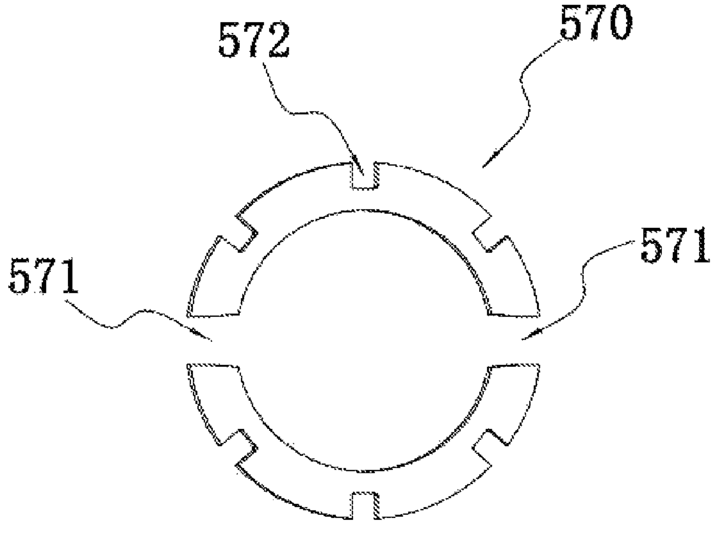
FIG. 18 is a structure view of a shift unit of the shift mechanism in the example in FIG. 11.
Figure 19:
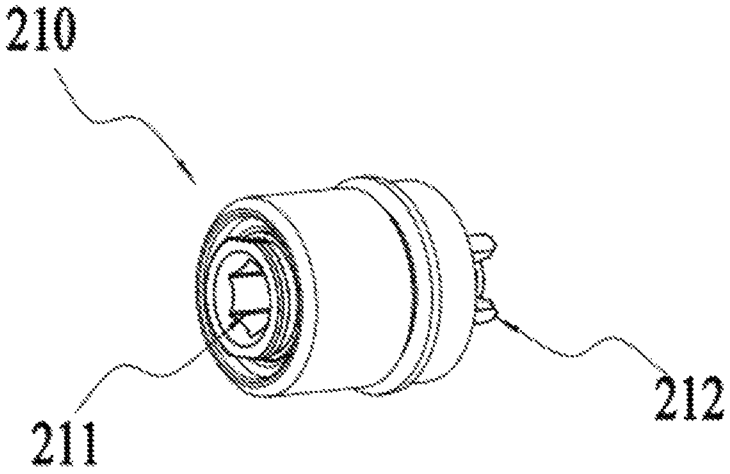
FIG. 19 is a structure view of an output unit in the present application.

As shown in FIG. 18, the shift unit 570 is an annular frame rotatable about the shift axis 201, where locking slots 571 are distributed in the annular frame along a radial direction of the annular frame. For example, the locking slots 571 include several slots disposed on the annular frame and distributed along the radial direction of the annular frame, and openings are disposed on radial sides of the locking slots

571 to allow the moving member 620 to be disengaged from the annular frame. The locking slot 571 in this example is a straight slot configured to radially penetrate through the annular frame, that is, openings are disposed at an inner end of the locking slot 571 and an outer end of the locking slot 571, where the moving member 620 may move inward in the locking slot 571 along a radial direction of the locking slot 571 to an inner side of the annular frame, and thus the moving member 620 is disengaged from the annular frame to release the limit to the rotation of the annular frame. The locking slot may have an opening at the inner end. In other examples, the shift unit 570 may be in an oval shape or another shape, or the shift unit 570 may be a combined structure in which at least two arc-shaped strips are nested in a circular or arc-shaped slide slot. In this case, the locking slot may be a gap between every two arc-shaped strips.

The annular frame is also provided with mounting slots 572 connected to the shift mechanism 500. Referring to FIG. 12, bosses 561 are disposed on an inner wall of a bottom opening of the sleeve 560, where the bosses 561 are adapted to be engaged with the mounting slots 572, thereby mounting and fixing the shift unit 570.

Figure 17:
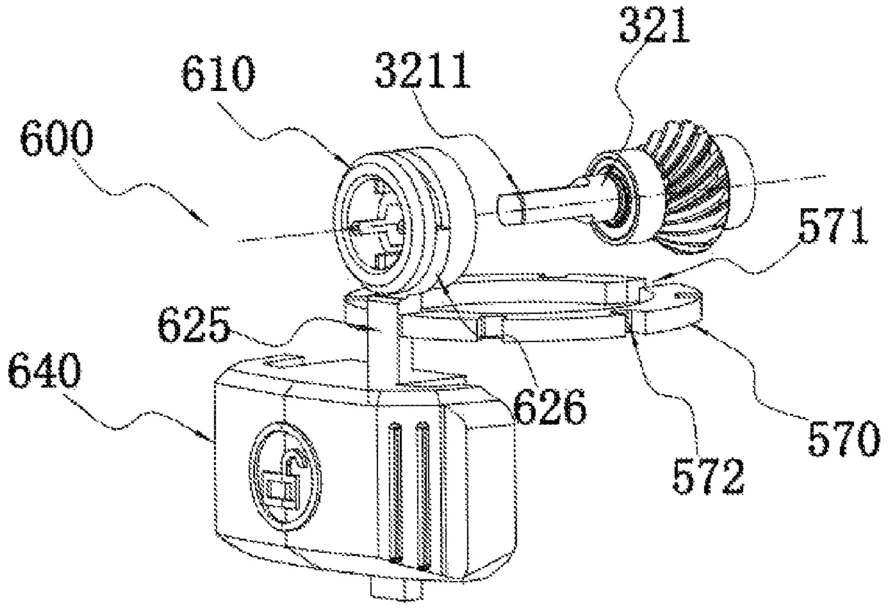
FIG. 17 is a schematic view showing the assembly of a clutch mechanism in the example in FIG. 11.

As shown in FIG. 17, in this example, the clutch mechanism 600 includes the shaft sleeve 610 and the moving member 620, where the moving member 620 is connected to the shaft sleeve 610, and the shaft sleeve 610 is movably connected to the transmission shaft 321 and may be connected to or disengaged from the output unit 210. The output unit 210, the shaft sleeve 610, and the transmission shaft 321 are disposed coaxially, and the moving member 620 drives the shaft sleeve 610 to move along the axial direction of the transmission shaft 321.

Figure 14:
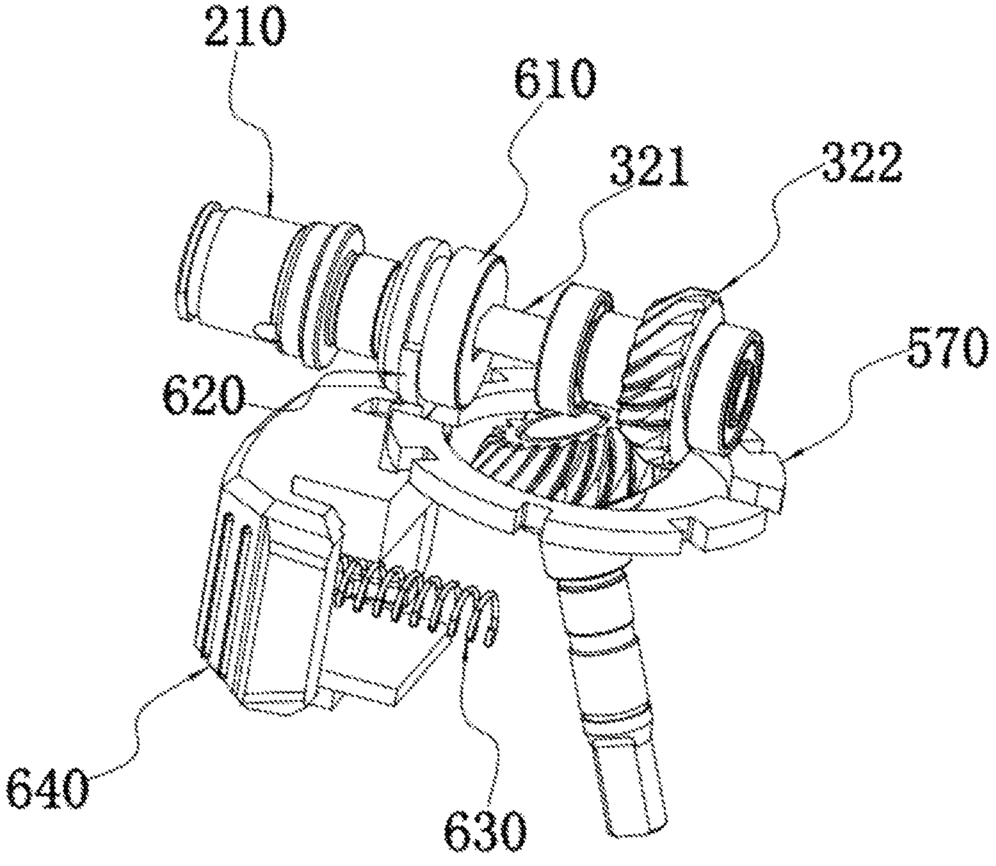
FIG. 14 is a structure view showing that the shift mechanism causes a clutch mechanism to be in a transmission position in the example in FIG. 11.
Figure 15:
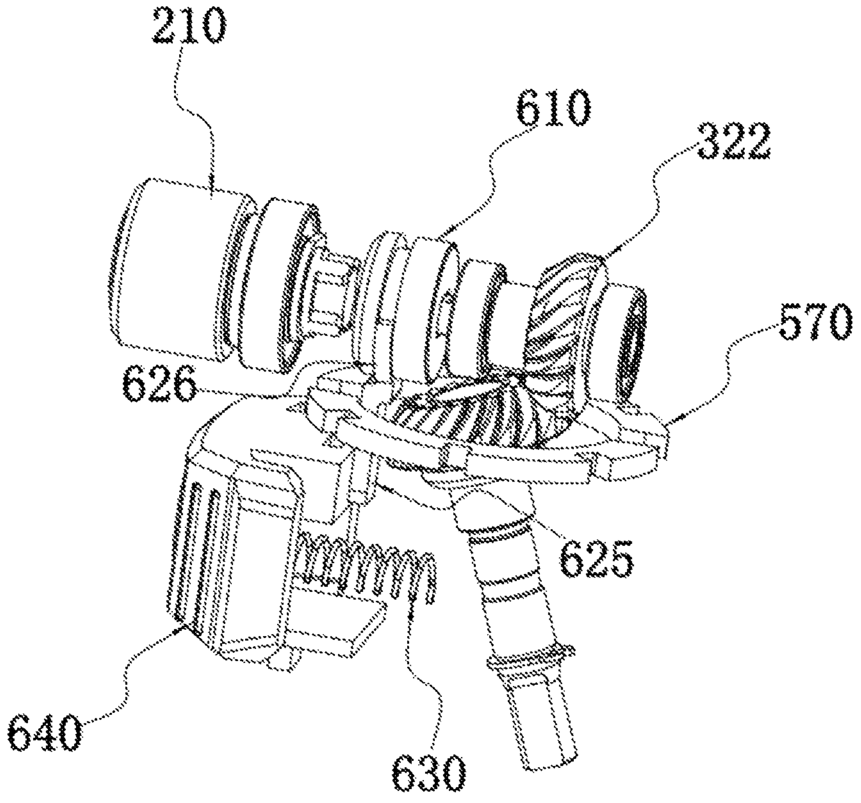
FIG. 15 is a structure view showing that the shift mechanism causes a clutch mechanism to be in a disengagement position in the example in FIG. 11.

As shown in FIGS. 14 and 15, the clutch mechanism in the example of the present application further includes an operation member 640 which drives the moving member 620 to move, where the moving member 620 in the transmission position mates with the locking slot 571 and restrains the shift unit 570 from rotating, and the moving member 620 in the disengagement position is disengaged from the locking slot 571 and allows the shift unit 570 to rotate. For example, the operation member 640 is a button disposed at the front end of the body and below the shift mechanism 500.

The clutch mechanism 600 in this example further includes the biasing member 630 disposed at an end portion of the operation member 640, where the biasing member 630 applies a biasing force to the operation member 640 to cause the operation member 640 to drive the clutch mechanism to be in the transmission position, and after the user releases the operation member 640, the moving member 620 and the operation member 640 can return to the transmission position under the action of the biasing member 630.

For example, as shown in FIG. 17, the moving member 620 is disposed across the shaft sleeve 610 along the radial direction, and the moving member 620 is a shift fork including a shift lever 625 and a claw 626, where the shift lever 625 and the claw 626 are integrally formed and the claw 626 is formed at a top end of the shift lever 625. As shown in FIG. 13, the groove 612 is disposed on the shaft sleeve 610 corresponding to the claw 626, for example, the groove 612 is the annular groove cut along the outer circumference of the shaft sleeve 610, where the claw 626 is clamped in the groove 612, and the shift lever 625 passes through the locking slot to be connected to the operation member 640.

When the power tool is used normally, the moving member 620 is in the transmission position, and the shaft sleeve 610 is in the transmission connection to the output unit 210 at the front end. In this case, the torque of the transmission shaft 321 of the gearbox may be normally transmitted to the output unit 210.

When the working accessory 900 needs to be shifted, the user manually presses the operation member 640 to drive the moving member 620 to move toward a radial inner side of the locking slot 571 along the locking slot 571, the shaft sleeve 610 is disengaged from the output unit 210 in the working position, and the output unit 210 stops outputting power. After the moving member 620 moves until the moving member 620 is disengaged from the locking slot 571, the moving member 620 is in the disengagement position, and the user may apply a force to the shift mechanism 500, the output unit, or the working accessory manually or by means of an external object such as a wall or the worktable so that the shift mechanism 500 is rotated to rotate the output unit in the working position to the non-working position and rotate the output unit in the non-working position to the working position.

When the user releases the operation member 640, the operation member 640 automatically returns to an initial position under the action of the biasing member, the moving member 620 returns to the transmission position, the shaft sleeve 610 is in the transmission connection to the output unit 210 in the working position, and the output unit 210 may output power to the outside and work normally.

What is claimed is:

1. A power tool, comprising:

a body comprising a first handle having a longitudinal axis;

an output assembly disposed at an end portion of the first handle comprising at least two output units spaced apart and used for connecting working accessories;

a power mechanism comprising an electric motor and a transmission unit which drive the output assembly to move about an output axis;

a battery pack removably mountable to the body and electrically coupleable to the power mechanism, the battery pack including a standing surface, where the power tool may stand vertically on a surface of a worktable through the standing surface of the battery pack, the output axis is disposed obliquely with respect to the standing surface;

a switch assembly disposed on the body and controlling the power mechanism;

a shift mechanism comprising mounting portions wherein each of the at least two output units is supported by a respective one of the mounting portions and the shift mechanism is rotatably disposed at the end portion of the first handle and has a shift axis about which the shift mechanism is rotatable; and a clutch mechanism movably connected to the shift mechanism;

wherein the clutch mechanism has a transmission position in which an output unit among the at least two output units is in a transmission connection to the transmission unit and a disengagement position in which the clutch mechanism is disengaged from the shift mechanism, and wherein, when the clutch mechanism is in the disengagement position, the shift mechanism is rotatable with respect to the body, wherein an angle $\alpha$ between the longitudinal axis of the first handle and the shift axis is greater than or equal to 10° and less than or equal to 60°, the electric motor and the transmission unit are disposed in the first handle, and wherein the clutch mechanism comprises a shaft sleeve and a moving member, the moving member is connected to the shaft sleeve, and the shaft sleeve is movably connected to the transmission unit and driven by the moving member to be connected to or disengaged from the output unit.

2. The power tool according to claim 1, wherein the clutch mechanism or the transmission unit is at least partially disposed between two output units spaced apart.

3. The power tool according to claim 1, wherein the transmission unit comprises a transmission shaft, the transmission shaft comprises a clutch transmission portion, the shaft sleeve is movably connected to the clutch transmission portion, the transmission shaft transmits torque to the shaft sleeve via the clutch transmission portion, and the clutch transmission portion comprises a noncircular shaft disposed on an end portion of the transmission shaft and the noncircular shaft mates with and is connected to a noncircular hole on the shaft sleeve.

4. The power tool according to claim 3, wherein the output unit, the shaft sleeve, and the transmission shaft are disposed coaxially, the transmission position and the disengagement position are distributed along an axial direction of the transmission shaft, and the moving member drives the shaft sleeve to move along the axial direction of the transmission shaft.

5. The power tool according to claim 1, wherein the shift mechanism comprises a locking portion and an unlocking portion, when the clutch mechanism is in the transmission position, the clutch mechanism mates with the locking portion and restrains the shift mechanism from rotating, and, when the clutch mechanism is in the disengagement position, the clutch mechanism is disengaged from the locking portion and allows the shift mechanism to rotate.

6. The power tool according to claim 5, wherein the locking portion comprises a plurality of straight slots, the unlocking portion is an annular slot, the annular slot and the shift axis are disposed coaxially, and an end portion of each of the plurality of straight slots intersects with the annular slot.

7. The power tool according to claim 1, wherein the moving member comprises a first connection portion adapted to be inserted into a straight slot and an annular slot, the annular slot forms the disengagement position, and the straight slot forms the transmission position.

8. The power tool according to claim 1, wherein the shift mechanism further comprises a shift unit connected to the mounting portions.

9. The power tool according to claim 8, wherein the shift unit is an annular frame rotatable about the shift axis.

10. The power tool according to claim 9, wherein a plurality of locking slots are distributed along a radial direction of the annular frame and one of the plurality of locking slots causes the clutch mechanism to be in the transmission position.

11. The power tool according to claim 1, wherein the shift mechanism is a shell-shaped structure and provided with an opening at a bottom of the shift mechanism.

12. The power tool according to claim 11, wherein the shift unit is disposed at the opening.

13. The power tool according to claim 1, wherein the shift mechanism is a U-shaped support comprising a connection base and a pair of sidewalls and the connection base is connected between the pair of sidewalls.

14. The power tool according to claim 13, wherein the clutch mechanism or the transmission unit is at least partially disposed between the pair of sidewalls.

15. The power tool according to claim 1, wherein a torque transmission member is provided at another end of the shaft sleeve, the output unit comprises a clamping portion and a connection portion, the clamping portion is used for mounting a working accessory, and the connection portion is in the transmission connection to the torque transmission member.

16. The power tool according to claim 15, wherein the torque transmission member comprises engagement slots disposed on the shaft sleeve, the connection portion comprises a transmission claw disposed on the output unit, and the engagement slots are adapted for insertion of the transmission claw.

17. A power tool, comprising:

a body comprising a first handle;

an output assembly disposed at an end portion of the first handle comprising at least two output units spaced apart and used for connecting working accessories and rotatable about a shift axis to shift an output unit among the at least two output units to a working position or a non-working position;

a power mechanism comprising an electric motor and a transmission unit which drive the output assembly to move about an output axis;

a battery pack removably mountable to the body and electrically coupleable to the power mechanism, the battery pack including a standing surface, where the power tool may stand vertically on a surface of a worktable through the standing surface of the battery pack, the output axis is disposed obliquely with respect to the standing surface;

a switch assembly disposed on the body and controlling the power mechanism; and a clutch mechanism movably connected to a shift mechanism;

wherein the clutch mechanism has a transmission position in which the output unit is in a transmission connection to the transmission unit and a disengagement position in which the clutch mechanism is disengaged from the output assembly and, when the clutch mechanism is in the disengagement position, the output assembly is rotatable with respect to the body, wherein the electric motor and the transmission unit are disposed in the first handle, and the battery pack is disposed at a bottom of the body, and when the power tool stands, an orthographic projection of a center of gravity of the power tool on the standing surface is in the standing surface, and wherein the clutch mechanism comprises a shaft sleeve and a moving member, the moving member is connected to the shaft sleeve, and the shaft sleeve is movably connected to the transmission unit and driven by the moving member to be connected to or disengaged from the output unit.

18. The power tool according to claim 17, wherein the transmission unit further comprises a first bevel gear and a second bevel gear which mesh with each other and the first bevel gear is coaxially connected to a shaft of the transmission.

* * * * *